(12) United States Patent
Gartrell et al.

(10) Patent No.: US 10,048,570 B1
(45) Date of Patent: Aug. 14, 2018

(54) ADJUSTABLE MODULAR ATTACHMENT FOR A VIDEO CAMERA SYSTEM

(71) Applicant: Logitech Europe S.A., Lausanne (CH)

(72) Inventors: Andrew Gartrell, Walnut Creek, CA (US); Aron Michael Rosenberg, Lafayette, CA (US); Gaurav Bradoo, San Francisco, CA (US); Timucin Kip, Burlingame, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 15/583,873

(22) Filed: May 1, 2017

(51) Int. Cl.
| | |
|---|---|
| *G03B 17/02* | (2006.01) |
| *G03B 17/56* | (2006.01) |
| *F16M 11/14* | (2006.01) |
| *H04N 5/225* | (2006.01) |
| *F16M 13/02* | (2006.01) |

(52) U.S. Cl.
CPC .............. *G03B 17/02* (2013.01); *F16M 11/14* (2013.01); *F16M 13/02* (2013.01); *G03B 17/561* (2013.01); *H04N 5/2252* (2013.01); *H04N 5/2257* (2013.01); *F16M 2200/08* (2013.01)

(58) Field of Classification Search
None
See application file for complete search history.

(56) References Cited

U.S. PATENT DOCUMENTS

| | | | |
|---|---|---|---|
| 6,089,517 A | 7/2000 | Johnstone | |
| 9,071,740 B1 * | 6/2015 | Duffy | H04N 5/2252 |
| 9,309,012 B1 | 4/2016 | Kilgore et al. | |
| 9,948,837 B1 | 4/2018 | Gartrell et al. | |
| 2004/0048507 A1 * | 3/2004 | Hage | G08B 13/19619 439/332 |

(Continued)

FOREIGN PATENT DOCUMENTS

| | | |
|---|---|---|
| DE | 0857611 A2 | 8/1998 |
| NL | 2002765 C | 10/2010 |
| NL | 1037443 C | 5/2011 |

OTHER PUBLICATIONS

Non-Final Office Action for U.S. Appl. No. 15/583,875, dated May 7, 2018, 30 pages.

(Continued)

*Primary Examiner* — W B Perkey
(74) *Attorney, Agent, or Firm* — Kilpatrick, Townsend & Stockton, LLP

(57) ABSTRACT

In certain embodiments, a video camera system includes a modular attachment to couple to a video camera housing, the modular attachment including a slot extending into the modular attachment and a base support including a ball-and-socket joint providing a range of motion for the base support and a tongue fixed to the ball-and-socket joint and extending therefrom, where the slot is configured to receive the tongue such that the modular attachment couples and secures to the base support according to a first friction, and where an orientation of the battery pack with respect to the base support is adjustable according to the range of motion of the ball-and-socket joint according to a second friction. The second friction can be greater than the first friction such that coupling or decoupling the battery pack from the base support does not cause the ball-and-socket joint to rotate.

19 Claims, 12 Drawing Sheets

(56) References Cited

U.S. PATENT DOCUMENTS

| | | |
|---|---|---|
| 2005/0122424 A1* | 6/2005 | Overstreet ........... F16M 11/041 |
| | | 348/373 |
| 2007/0126872 A1 | 1/2007 | Bolotine et al. |
| 2007/0126871 A1 | 6/2007 | Henninger, III et al. |
| 2007/0297788 A1 | 12/2007 | Wahl et al. |
| 2009/0021634 A1 | 1/2009 | Chang |
| 2010/0286904 A1 | 11/2010 | Meissner et al. |
| 2012/0013790 A1* | 1/2012 | Chu ..................... G03B 17/561 |
| | | 348/372 |
| 2013/0128110 A1 | 5/2013 | Jannard |
| 2013/0175413 A1* | 7/2013 | Waugh ................ F16M 11/041 |
| | | 248/124.1 |
| 2016/0127643 A1* | 5/2016 | Huerta ............... H04N 5/23241 |
| | | 348/211.2 |
| 2017/0176842 A1 | 1/2017 | Jung |
| 2018/0054542 A1 | 2/2018 | Petty et al. |
| 2018/0109704 A1 | 4/2018 | Gilbert |

OTHER PUBLICATIONS

Extended European Search Report for EP Patent Application No. 18 161 574.1, dated May 28, 2018, 8 pages.

\* cited by examiner

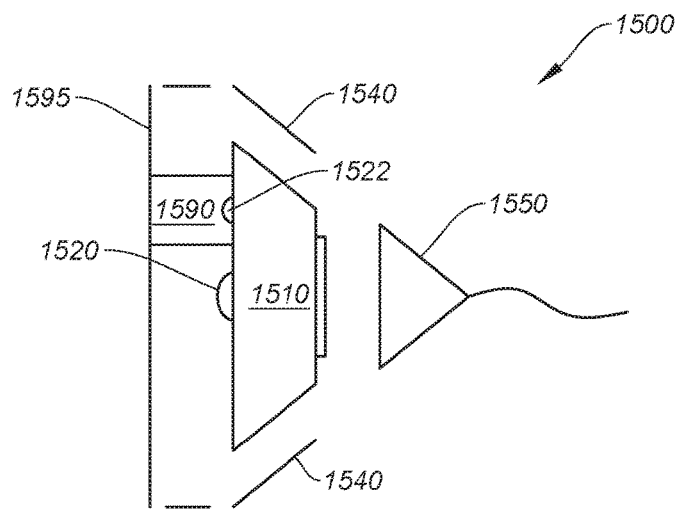
FIG. 15
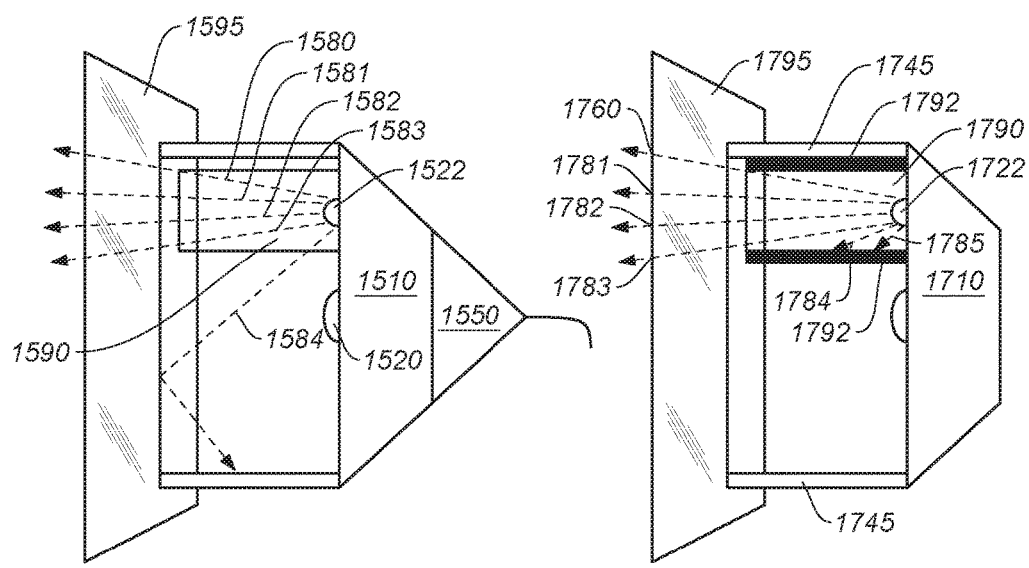
FIG. 16
FIG. 17

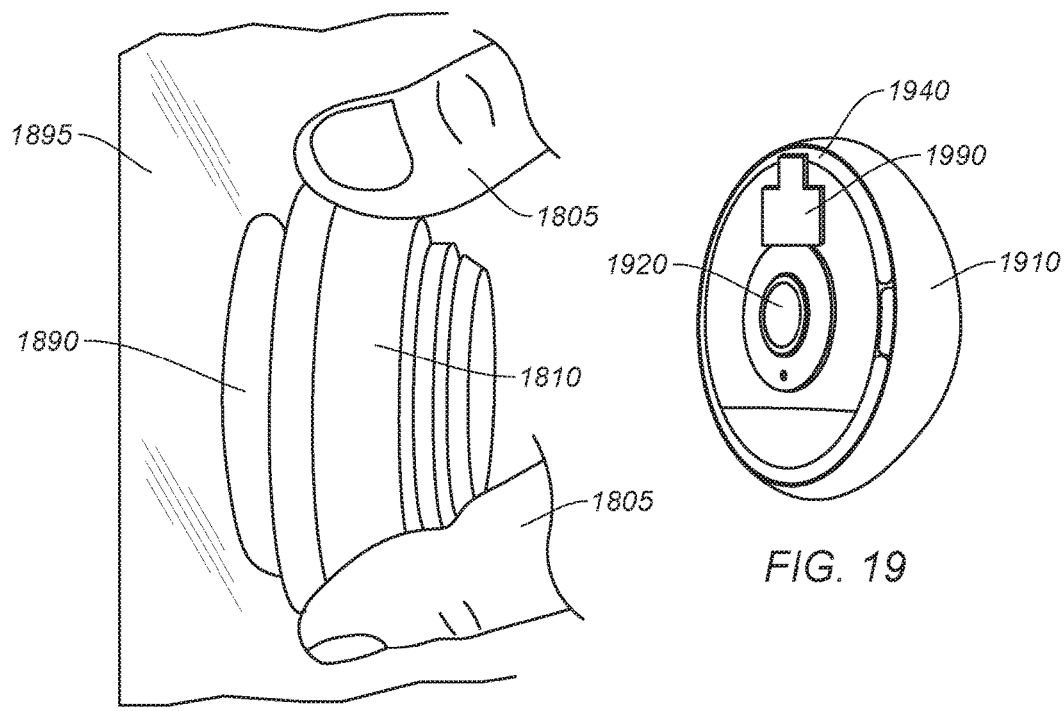
FIG. 18
FIG. 19
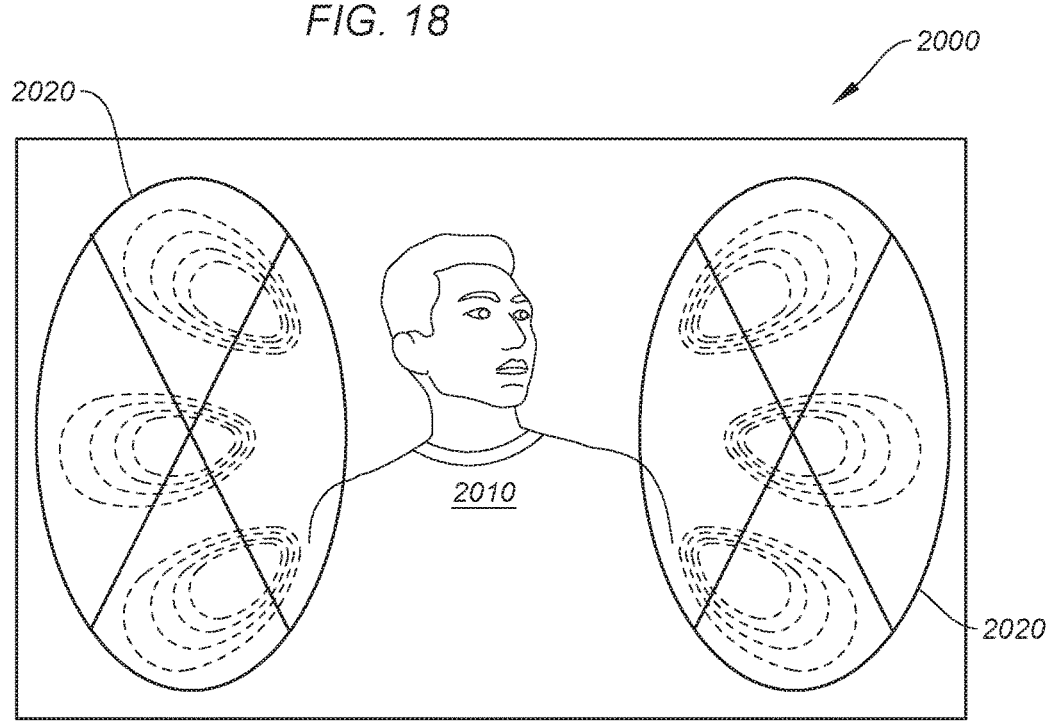
FIG. 20

ADJUSTABLE MODULAR ATTACHMENT FOR A VIDEO CAMERA SYSTEM

CROSS-REFERENCES TO RELATED APPLICATIONS

The following regular U.S. patent applications (including this one) are being filed concurrently, and the entire disclosure of the other applications are incorporated by reference into this application for all purposes:

Application Ser. No. 15/583,870, filed May 1, 2017, entitled "MODULAR VIDEO CAMERA SYSTEM"; and Application Ser. No. 15/583,875, filed May 1, 2017, entitled "MODULAR COUPLING FOR A VIDEO CAMERA SYSTEM".

BACKGROUND

Home security video cameras and web cameras ("web cams") have come into prominence in recent years as innovation in this sector has provided many powerful enhancements, new capabilities, and improved fidelity. Some contemporary security and web cameras can have wireless access, wireless power, night vision (e.g., infra-red sensing), remote access and control, improved video resolution, and advanced control features (e.g., automation).

Despite these improvements, some challenges remain. For instance, some mounting applications are not feasible with conventional designs due to certain video artifacts. In some cases, wireless (i.e., battery powered) video cameras have a limited battery life, which typically requires a temporary removal of the mounted video camera for recharging. Removal and reinstallation of conventional battery powered video cameras commonly causes inadvertent adjustments to the video camera alignment and orientation. These inefficiencies and inconveniences can be found in even the most contemporary designs. While home security camera and web cam design continue to improve, better designs are needed.

BRIEF SUMMARY

In some embodiments, a video camera system includes a modular attachment to couple to a video camera housing, the modular attachment including a slot extending into the modular attachment and a base support including a ball-and-socket joint providing a range of motion for the base support and a tongue fixed to the ball-and-socket joint and extending therefrom, where the slot is configured to receive the tongue such that the modular attachment couples and secures to the base support, and where an orientation of the modular attachment with respect to the base support is adjustable according to the range of motion of the ball-and-socket joint. In some cases, the modular attachment includes a shaft disposed internally and configured perpendicular to the slot, wherein the tongue includes a concavity to receive the shaft to secure the tongue inside the slot. The shaft can include a spring-loaded pin providing a force to secure the tongue inside the slot. Alternatively or additionally, the shaft can include a threaded screw to secure the inside the slot. The tongue may be held within the slot according to a first friction, where a motion of the ball-and-socket joint rotates according to a second friction, and where the second friction is greater than the first friction such that coupling or decoupling the modular attachment from the base support with a force greater than the first friction and less than the second friction does not cause the ball-and-socket joint to rotate.

In further embodiments, the modular attachment may include a plurality of electrical contacts, and wherein the modular attachment couples to the camera housing via an interface on the camera housing that includes a plurality of concentric electrical traces disposed in a back side of the camera housing and a notched mounting apparatus disposed on the back side of the camera housing, where the notched mounting apparatus is operable to receive and secure the battery pack to the camera housing such that the modular attachment is mechanically and rotatably coupled to the camera housing, and where one or more of the concentric electrical traces are configured to contact one or more of the plurality of electrical contacts of the modular attachment and remain in contact with the one or more of the plurality of electrical contacts as the camera housing is rotated with respect to the modular attachment. The modular attachment may be a battery pack to provide power to the video camera system.

In certain embodiments, a video camera system includes a battery pack to couple to a video camera, the battery pack including an energy storage device to store an electrical charge, an electrical interface to electrically couple the battery pack to the video camera, and a slot extending into the battery pack, where the slot is configured to receive a tongue fixed to a ball of a ball-and-socket joint extending from a base support apparatus, and where the slot is configured to secure the battery pack to the base support. The tongue can be retained in the slot via a frictional fit. The battery pack may include a shaft disposed internally and configured perpendicular to the slot, and may be configured to couple to a concavity in the tongue (or other feature to secure to) to secure the tongue inside the slot. The shaft can include a spring-loaded pin providing a force or a threaded screw to secure the tongue inside the slot.

In some embodiments, the electrical interface of the battery pack can include a plurality of electrical contacts, where the battery pack couples to the camera housing via an interface of the camera housing that includes a plurality of concentric electrical traces disposed in the back side of the camera housing, where one or more of the concentric electrical traces are configured to contact one or more of the plurality of electrical contacts of the battery pack and remain in contact with the one or more of the plurality of electrical contacts as the camera housing, while coupled to the battery pack, is rotated with respect to the battery pack. The battery pack can be mechanically coupled to the camera housing via a notched mounting apparatus disposed on the back side of the camera housing, where the battery pack is operable to mount to the notched mounting apparatus such that the battery pack is mechanically and rotatably coupled to the camera housing. In some cases, one or more of the concentric electrical traces are configured to contact one or more of the plurality of electrical contacts of the battery pack and remain in contact with the one or more of the plurality of electrical contacts as the camera housing is rotated with respect to the battery pack.

In certain embodiments, a video camera system includes a camera housing including a camera disposed in the camera housing, a base unit including a slot disposed therein, the base unit rotatably coupled to the camera housing such that the camera housing can rotate with respect to the base unit on an axis, and a base support including a tongue extending from an adjustable apparatus that can rotate over a range of motion, where the tongue can be inserted and removed from the slot of the base unit to couple and decouple the base support from the base unit, and where the minimum force to insert or remove the tongue of the base support from the slot of the base unit is less than a minimum force to rotate the adjustable apparatus of the base support such that inserting or removing the tongue from the slot does not cause the adjustable apparatus to rotate. Alternatively or additionally, a minimum force to rotate the camera housing with respect to the base unit is less than a minimum force to insert or remove the tongue of the base support from the slot of the base unit such that rotating the camera housing does not cause the tongue to be inserted or removed from the slot.

In certain implementations, the video camera system can further include a surface mount coupled to the base support via a quick release mechanism and a surface via a fixed coupling means, where the minimum force to cause the quick release mechanism to release is less than a minimum force to decouple the base support from the surface such that releasing the quick release mechanism does not cause the base support to decouple from the surface. Alternatively or additionally, the minimum force to rotate the adjustable apparatus is less than a minimum force to release the quick release mechanism such that rotating the adjustable apparatus does not cause the quick release mechanism to release. In some cases, the adjustable apparatus includes a ball-and-socket joint. The camera housing may further include a plurality of concentric electrical traces disposed in the back side of the camera housing and a notched mounting apparatus disposed on the back side of the camera housing, where the notched mounting apparatus is operable to receive and secure the base unit to the housing such that the modular attachment is mechanically and rotatably coupled to the housing, and where one or more of the concentric electrical traces are configured to contact one or more electrical contacts of the base unit and remain in contact with the one or more electrical contacts as the camera housing is rotated with respect to the base unit.

In some embodiments, the base unit can be a battery pack including one or more energy storage devices to store an electrical charge, where the battery pack includes a shaft disposed internally and configured perpendicular to the slot, where the tongue includes a concavity to receive the shaft to secure the tongue inside the slot, and where the shaft, when securing the tongue inside the slot, increases the minimum force to insert or remove the tongue of the base support from the slot of the base unit. In some cases, the shaft includes a spring-loaded pin providing a force to secure the tongue inside the slot.

BRIEF DESCRIPTION OF THE DRAWINGS

The detailed description is set forth with reference to the accompanying figures.

FIG. 15 shows aspects of an improved window-mounted modular video camera system using night vision, according to certain embodiments.

FIG. 16 shows aspects of an improved window-mounted modular video camera system using night vision, according to certain embodiments.

FIG. 17 shows aspects of an improved window-mounted modular video camera system using night vision, according to certain embodiments.

FIG. 18 shows aspects of an enhancement to improve night vision in a window-mounted modular video camera system, according to certain embodiments.

FIG. 19 shows aspects of an enhancement to improve night vision in a window-mounted modular video camera system, according to certain embodiments.

FIG. 20 shows aspects of an enhancement to improve night vision in a window-mounted modular video camera system, according to certain embodiments.

DETAILED DESCRIPTION

Figure 1:
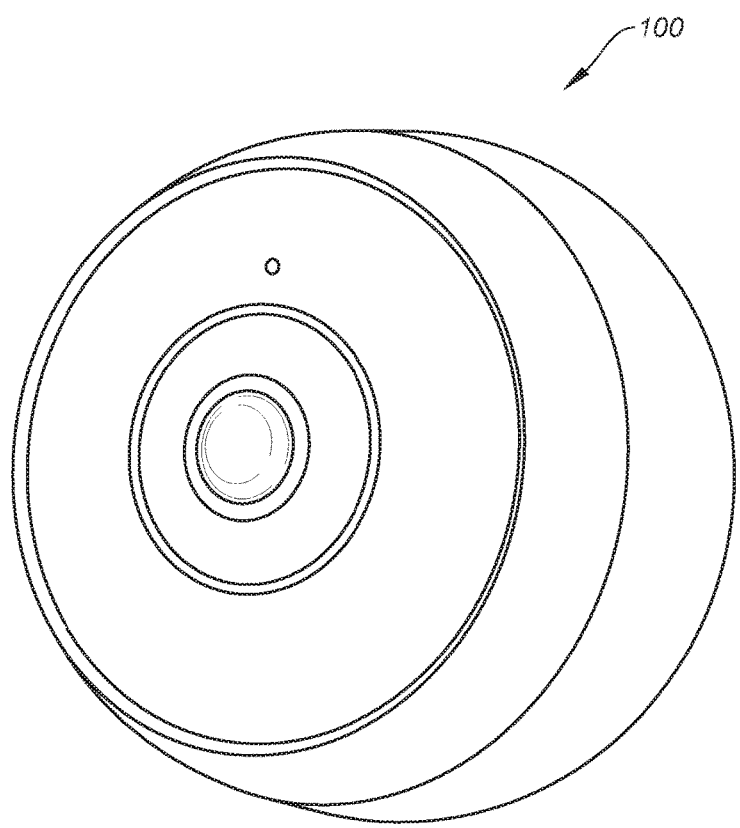
FIG. 1 shows a modular video camera system, according to certain embodiments.

Aspects of the invention relate generally to video camera systems. More specifically, certain embodiments include a configurable, modular video camera system that can be used, e.g., for home security, web-based communications, and the like.

In the following description, various embodiments of a modular video camera system will be described. For purposes of explanation, specific configurations and details are set forth in order to provide a thorough understanding of the embodiments. However, it will be apparent to one skilled in the art that certain embodiments may be practiced without every disclosed detail. Furthermore, well-known features may be omitted or simplified in order not to obscure the embodiments described herein.

Certain embodiments of the invention include a modular video camera system that can be adapted to mount to a number of different surfaces and perform a number of different functions. For instance, some embodiments may include a battery pack with a novel coupling apparatus, a window pane mount with night vision enhancement, various surface mount interfaces, and a host of other modular solutions.

In some embodiments, a video camera housing for a modular video camera system has a front portion with a camera lens and infra-red (IR) emitter disposed thereon, a mounting apparatus to couple to and secure the modular video camera system to a window pane such that the front portion of the housing faces the window pane, and a silicone-based compound, placed between the IR emitter and the window pane, that is translucent to IR light and prevents IR light from reflecting off of the window pane and into the camera lens. Some aspects of a window pane mounting system are shown and described with respect to FIGS. 3 and 11-20.

Certain embodiments may include a battery pack for a modular video camera system that is coupled to a base support having an orientation adjustment apparatus to prevent inadvertent adjustments to an orientation of the modular video camera system when removing and remounting the battery pack. The battery pack can include a slot disposed therein to receive a tongue fixed to a ball-and-socket joint extending from the base support, where the tongue/slot apparatus operates to secure the battery pack to the base support, while also preventing any inadvertent movement of the ball-and-socket joint when the battery pack is removed and reattached to the base support. The tongue can be secured in the slot by a shaft or securing mechanism disposed in the battery pack. Some aspects of a battery pack are shown and described with respect to FIGS. 8-10.

In further embodiments, a camera housing can be rotatably coupled to a base unit in a modular video camera system such that the camera housing can rotate with respect to the base unit on an axis. The base unit may include a shaft (e.g., tongue) extending from an adjustable apparatus (e.g., ball-and-socket joint) that can rotate over a range of motion with a shaft (e.g., tongue) extending therefrom, where the shaft can be inserted and removed from the slot of the base unit to couple and decouple the base support from the base unit. Each of the couplings may have include a particular amount of force to cause the various modular components to rotate, detach/reattach, and the like. In some embodiments, each of the respective forces can be configured to increase from the front of the modular video camera system to the back, such that adjustments made toward the front of the modular video camera system (e.g., rotating the housing) do not cause any movement or adjustment to adjacent components configured toward the back of the modular video camera system. For example, some embodiments may be configured such that a minimum force to rotate the camera housing with respect to the base unit is less than a minimum force to insert or remove the shaft of the base support from the slot of the base unit such that rotating the camera housing does not cause the shaft to be inserted or removed from the slot. This concept is further discussed below with respect to FIG. 21.

Modular Video Camera System with Versatile Capabilities

FIG. 1 shows a modular video camera system ("camera system") 100, according to certain embodiments. Camera system 100 can be adapted to receive a variety of modular attachments including wall mounts, wall socket mounts, window pane mounts, battery packs, and the like, as further discussed below. Camera system 100 can change a mode of operation based on the type of attachment coupled to it. For example, if a hard-wired power supply (see, e.g., FIG. 4A) is coupled to camera housing (e.g., housing 310), then a high performance mode of operation may commence with higher video resolution, continuous audio scanning (via a microphone) to pick up user voice commands, continuous motion detection, or the like, as would be understood by one of ordinary skill in the art. In contrast, if a battery pack is coupled to the housing, some functions can be turned off to conserve energy. For instance, camera system 100 may switch to a lower resolution video mode or temporarily shut down any non-essential image capture functionality as battery levels decrease. One of ordinary skill in the art would understand the many variations, modifications, applications, and alternative embodiments thereof.

Figure 2:
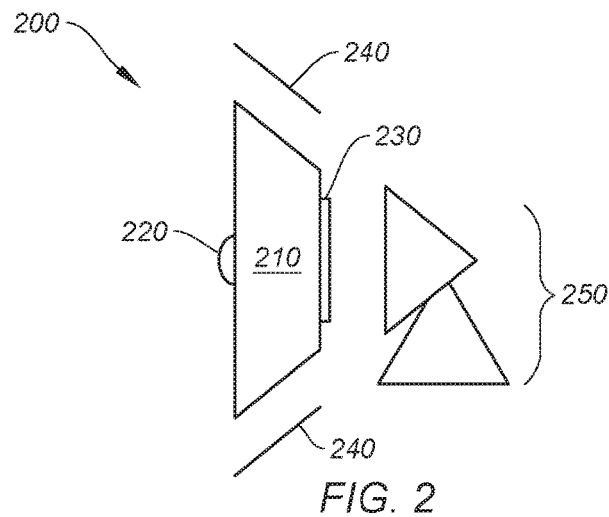
FIG. 2 shows a simplified diagram illustrating an abstracted representation of some common components in a modular video camera system, according to certain embodiments.

FIG. 2 shows a simplified diagram illustrating an abstracted representation of some common components in a modular video camera system 200, according to certain embodiments. Camera system 200 can include a housing 210, cover 240, and base unit 250. Housing 210 may include lens 220 and electrical coupling interface 230. Housing 210 may include additional features (not shown), such as LEDs (e.g., visible and infra-red), light sensors, microphones, speakers, input/output (I/O) pins, input jacks, electrical contacts (e.g., traces), or the like. Housing 210 is further discussed below in more detail with respect to FIGS. 5A-5B.

Cover 240 can perform a variety of functions, according to certain embodiments. For instance, in some window pane mounts, cover 240 can be an anchor point to couple a micro-suction ring. With a hard-wired wall mount, cover 240 may simply function as an aesthetic covering. Some further examples are discussed below at least with respect to FIGS. 4A-4F.

Base unit 250 is typically configured to secure housing 210 to a surface, according to certain embodiments. For instance, base unit 250 may include a cone backing mounted on a ball-and-socket jointed base, a 120 V socket interface, a tri-pod assembly, or the like. The ball-and-socket may include threaded/fixed hardware, a quick-release tongue apparatus (see, e.g., FIGS. 8-10), or the like. Further examples of base units are presented in FIGS. 4A-4F. It should be noted that base unit 250 is shown to include two components including a backing coupled to housing 210 and a support apparatus. In such cases, the backing (e.g., portion coupled directly to housing 210) can be referred to as the "base unit," and the component that couples the base unit to a surface, wall, power outlet, etc., can be referred to as the "base support."

Figure 3:
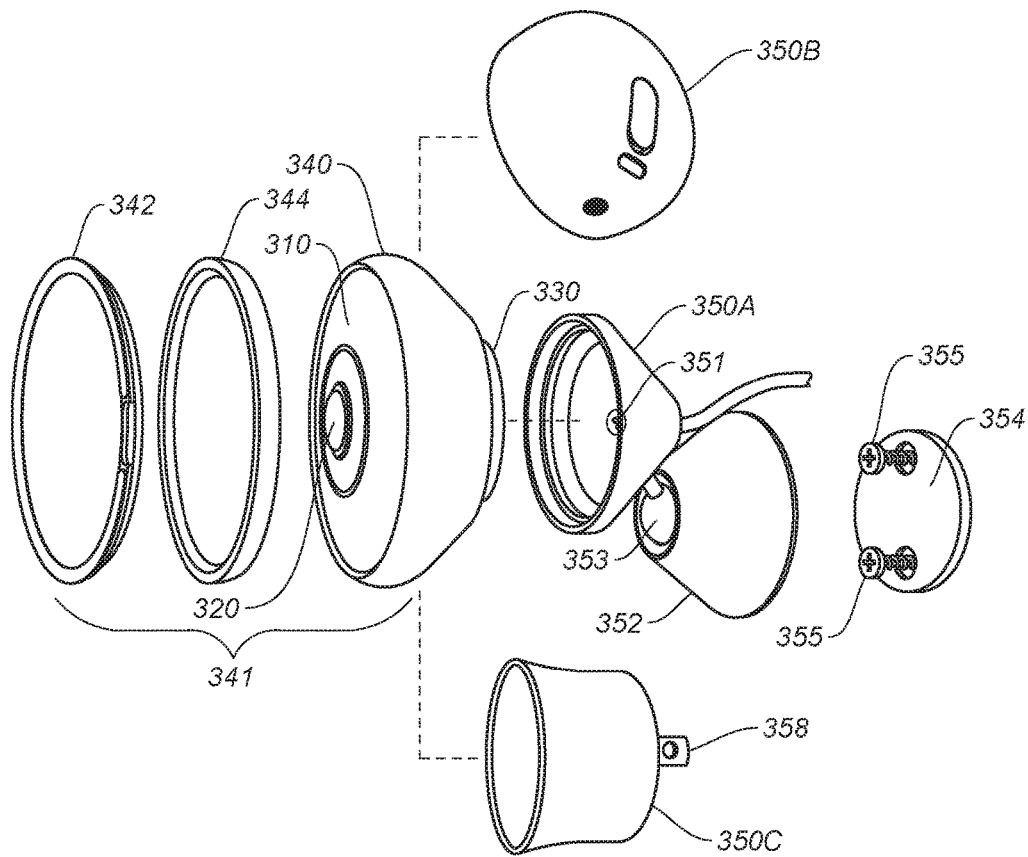
FIG. 3 shows an exploded view of a modular video camera system showing a number of optional modular attachments, according to certain embodiments.

FIG. 3 shows an exploded view of a modular video camera system 300 with a number of optional modular attachments, according to certain embodiments. Housing 310 includes lens 320 and electrical coupling interface 330. Many different types of front-side and back-side attachments can be coupled to housing 310 in a modular fashion, according to certain embodiments. On the front-side, cover 340 can be an aesthetic shell or covering. Alternatively or additionally, cover 340 can constitute a portion of, or be integrated with, one of the modular attachments (embodiment not shown). Referring back to FIG. 3, a window pane mounting apparatus 341 can include a cover ring 344 and mounting ring 342. In some embodiments, cover ring 344 couples to housing 310 and provides an anchor point for mounting ring 342. Mounting ring 342 may couple to a glass surface (or any preferably transparent surface) via a micro-suction disc ("micro-suction system"). Any suitable vacuum-based mounting apparatus may be used. Alternatively or additionally, an adhesive (e.g., glue, tape, etc.) can be used to couple mounting ring 342 to the target surface. Certain embodiments of a window pane mounting apparatus are further discussed below with respect to FIGS. 11-20. Other front-side attachments to housing 310 are possible, including various lenses, different LED arrays (e.g., visible or infra-red spectrum), visors (e.g., to block the sun in outdoor settings), or the like. One of ordinary skill in the art with the benefit of this disclosure would understand the many variations, modifications, and alternative embodiments thereof.

A host of different types of base units can be coupled to the rear side of housing 310. For instance, base unit ("cone") 350A can be mechanically coupled to housing 310 via one or more notched regions, as further discussed below with respect to FIGS. 5A-5B, and electrically coupled to housing 310 via electrical coupling interface 330 and electrical contacts 351. Cone 350A may be mounted to a surface or wall by any suitable apparatus. Referring to FIG. 3, cone 350A can be mounted to base unit 352 via a threaded screw attached to a ball-and-socket joint 353, which is then coupled to a wall or other surface via surface mount 354 and hardware 355.

In another implementation, base unit ("battery pack") 350B can be both mechanically and electrically coupled to housing 310, as further discussed below with respect to FIGS. 8-10. Alternatively, housing 310 can be coupled directly to a wall socket via base unit ("wall socket mount") 350C and electrical contacts 358. Many alternative modular configurations are possible. A variety of non-limiting examples of different modular configurations for a modular video camera system are presented in FIGS. 4A-4F.

Figure 4A:
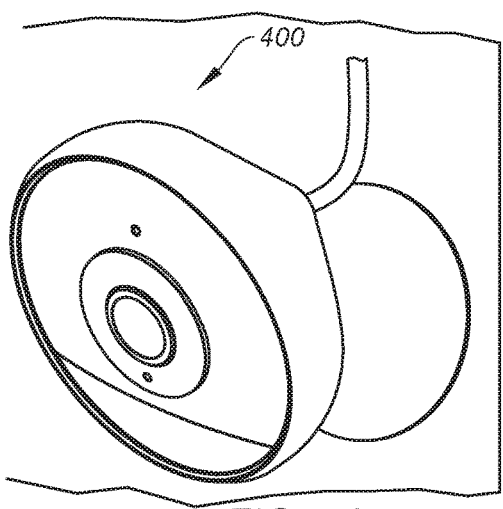
FIG. 4A shows a modular video camera system in a wall-mounted configuration, according to certain embodiments.

FIG. 4A shows a modular video camera system 410 in a wall-mounted configuration, according to certain embodiments. Camera system 410 includes a hard-wired conical base unit that is fixed to a wall. The housing and base unit may be coupled via a fixed connection (e.g., threaded screw), via a ball-and-socket assembly, or the like. The base unit can be fixed to the wall (or any surface) via any suitable coupling method (e.g., hardware including screws or pins, an adhesive, etc.).

Figure 4B:
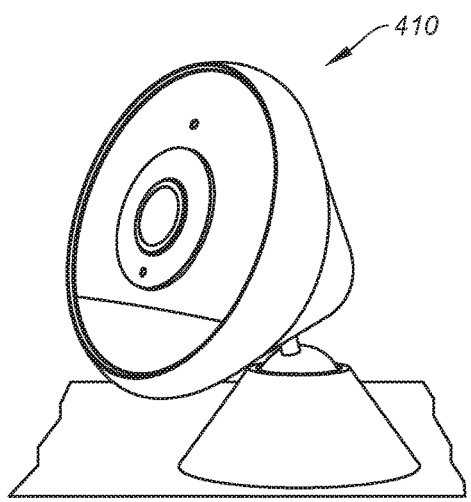
FIG. 4B shows a modular video camera system in a surface-mounted configuration, according to certain embodiments.

FIG. 4B shows a modular video camera system 420 in a surface-mounted configuration, according to certain embodiments. Similar to FIG. 4A, camera system 420 includes a hard-wired conical base unit that is configured on a surface. The housing and base unit may be coupled via a fixed connection (e.g., threaded screw), via a ball-and-socket assembly (as shown), or the like. The base unit may rest on the surface or can be coupled to the surface via any suitable coupling method (e.g., hardware or adhesive).

Figure 4C:
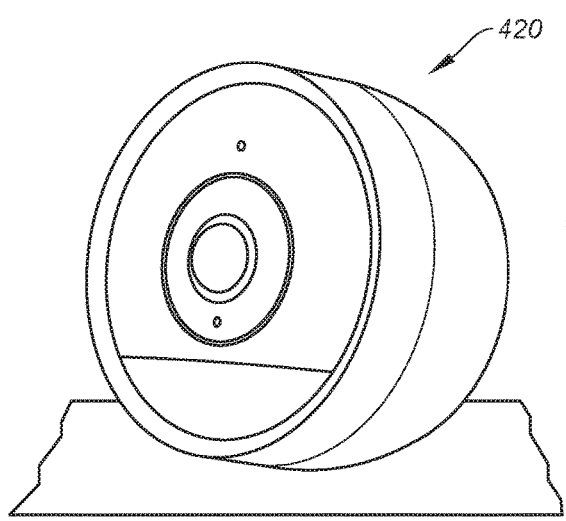
FIG. 4C shows a modular video camera system with a battery pack in a self-supporting configuration, according to certain embodiments.
Figure 4D:
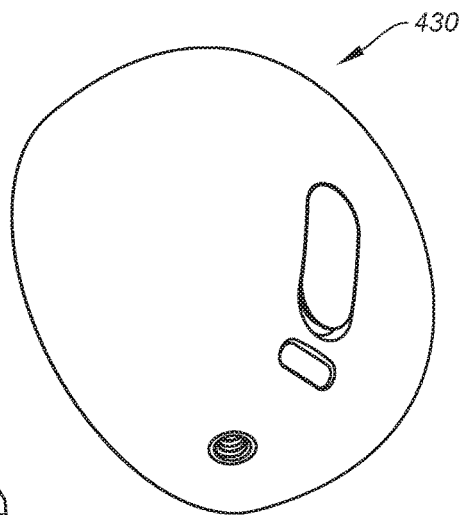
FIG. 4D shows a battery pack for a modular video camera system, according to certain embodiments.

FIG. 4C shows a modular video camera system 430 with a battery pack in a self-standing configuration, according to certain embodiments. FIG. 4D shows a rear view of a base unit ("battery pack") 440 for a modular video camera system, according to certain embodiments. Battery pack 440 may include a flat bottom portion to rest on a surface. Alternatively or additionally, battery pack 440 can include various attachments or interfaces to mount battery pack 440 (and a corresponding housing) to a surface. Referring to FIG. 4D, a threaded hole is shown to receive a screw from a fixed surface mount fixture, from a tripod mount, or the like. In some embodiments, battery pack 440 can also include a charging port and a slot to receive a tongue from a ball-and-socket-based base unit, as further discussed below with respect to FIGS. 8-10.

Figure 4E:
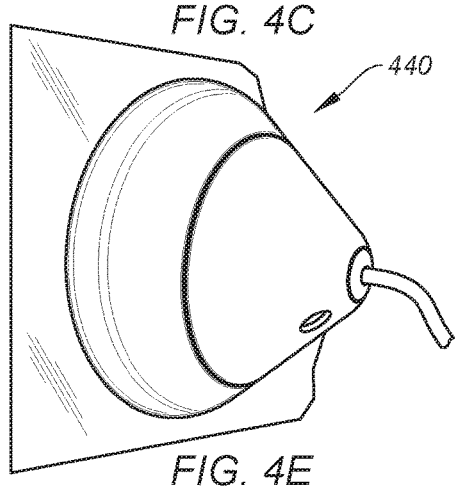
FIG. 4E shows a modular video camera system in a window-mounted configuration, according to certain embodiments.

FIG. 4E shows a modular video camera system 450 in a window-mounted configuration, according to certain embodiments. In some cases, a housing in camera system 450 can be coupled to a window pane via vacuum (e.g., micro-suction device), adhesive, or other suitable coupling method. Camera system 450 is shown with a hard-wired base unit ("power cone"), however some implementations may use a battery pack or other base unit, as would be understood by one of ordinary skill in the art.

Figure 4F:
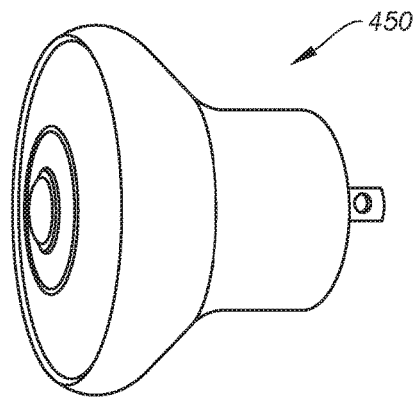
FIG. 4F shows a modular video camera system in a wall socket-mounted configuration, according to certain embodiments.

FIG. 4F shows a modular video camera system 460 in a wall socket-mounted configuration, according to certain embodiments. The base unit includes a plug for receiving power directly from a wall socket. Any type of wall socket attachment can be used (e.g., Type A-Type 0) over any suitable voltage range.

Modular Video Camera Housing

Figure 5A:
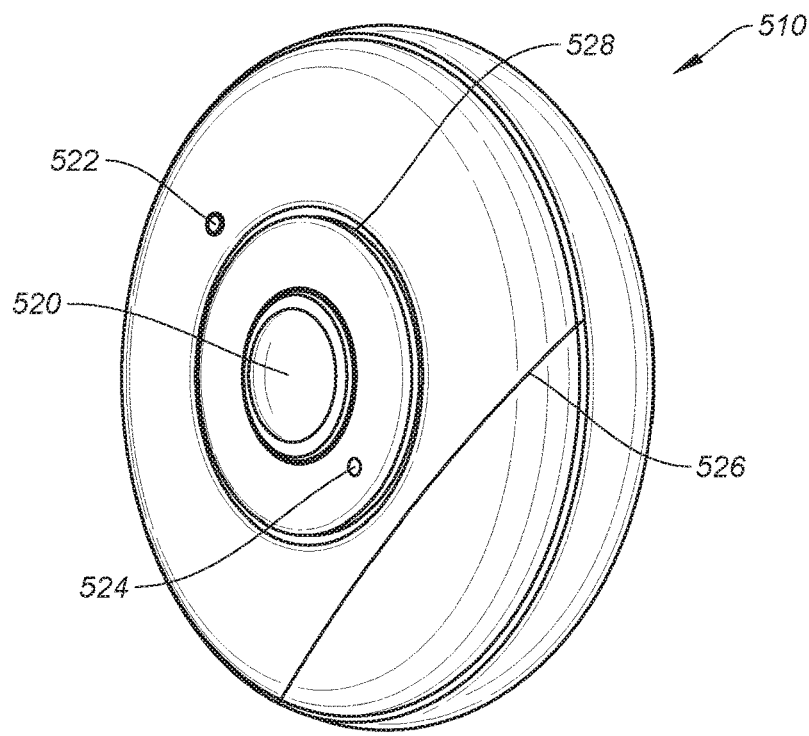
FIG. 5A shows a front side of a modular video camera system housing, according to certain embodiments.

FIG. 5A shows aspects of a housing for a modular video camera system, according to certain embodiments. Camera system 500 can include housing 510 with a number of components disposed thereon, which may include camera lens 520, infra-red (IR) emitter 522, ambient light sensor 524, passive IR sensor 526, and LED ring 528. Some embodiments may include fewer or more components, such as speakers, microphones, additional LEDs, and the like. One of ordinary skill in the art would understand the many variations, modifications, and alternative embodiments thereof.

Housing 510 is shown having a disk shape, according to certain embodiments. However, any suitable shape and size can be used. Housing 510 can house one or more processors, printed circuit boards (PCBs), and/or any other supporting electronics for the modular video camera system (e.g., camera system 300). For example, housing 510 may house some or all aspects of system 700 of FIG. 7, as further discussed below. Housing 510 may be comprised of any suitable material including thermoplastic elastomers (TPE), PVC, thermoplastic polyurethane (TPU), silicone-based compounds, rubber-based compounds (e.g., vulcanized rubber), metal (e.g., aluminum), polycarbonates, or other suitable material, as would be known by one of ordinary skill in the art.

Lens 520 can be of any suitable image sensor technology including, but not limited to, complementary metal-oxide-semiconductor (CMOS)-based and charge-coupled device (CCD) cameras. In some embodiments, multiple lenses can be used and each may be individually controlled (e.g., via processor 710). Alternatively or additionally, lens 520 can be focused and directed (e.g., aimed) via software (e.g., via aspects of system 700 or variants thereof) that controls optical characteristics of lens 520.

Ambient light sensor 524 can be configured to detect ambient light levels, which can be used to control one or more modes of operation, according to certain embodiments. For example, when ambient light levels are determined to be sufficiently low, the camera system may increase the image brightness, or switch from daytime mode to night vision mode (e.g., using IR light detection). In some cases, the brightness of LED ring 528 may change based on a detected ambient light level. For instance, in some power saving configurations, LED ring 528 may be brighter with sufficiently high ambient light levels, and dimmer with little to no ambient light. In some aspects, ambient light sensor 524 may also function as a motion sensor to detect motion (e.g., in front of the camera) based on the detected ambient light (e.g., changes in light, shadows, etc.). In further embodiments, motion detection may not be included, or may be implemented in a separate stand-alone device. One of ordinary skill in the art would understand the many variations, modifications, and alternative embodiments thereof.

IR emitter 522 can be an IR light emitting diode (LED) to illuminate an area in front of the camera system (e.g., lens 520) using IR light. In some cases, multiple IR emitters can be used. Visible light emitters may be used to illuminate an area in visible light, but typically are not included as natural light (e.g., the sun) or artificial light (e.g., light bulbs) provide sufficient illumination during normal use, and IR emitter(s) 522 provide sufficient IR light when night vision is enabled.

Passive IR sensor 526 can be configured to detect IR light, according to certain embodiments. For example, passive IR sensor 526 may detect light emitted by IR emitter(s) 522 (e.g., directly or indirectly by reflection). In some embodiments, passive IR sensor 526 may further perform motion detection for night vision applications, as would be understood by one of ordinary skill in the art.

Figure 5B:
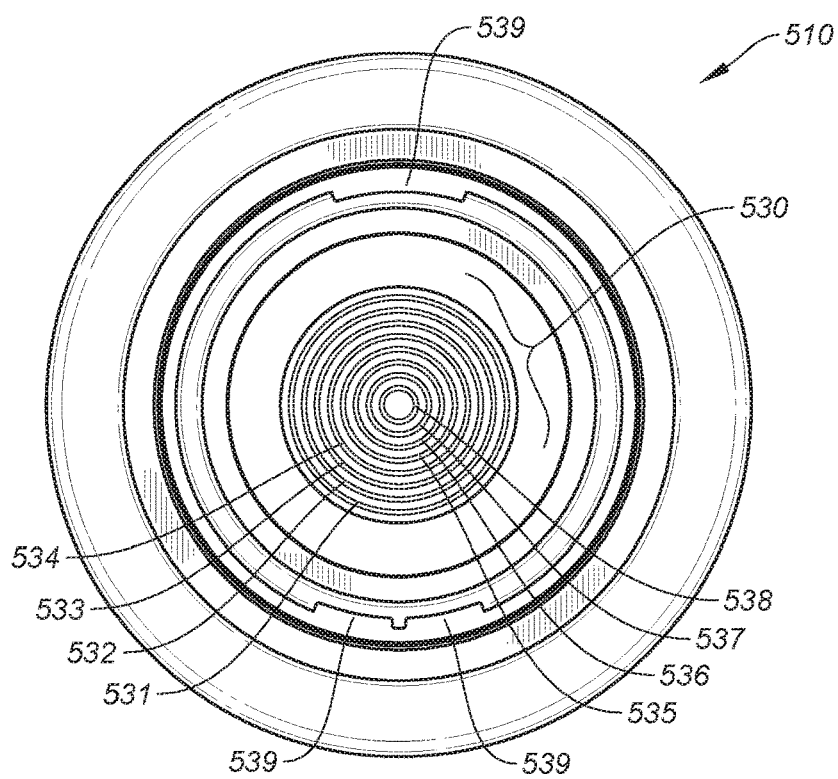
FIG. 5B shows a back side of a modular video camera system housing, according to certain embodiments.

FIG. 5B shows aspects of a back side of housing 510 for a modular video camera system, according to certain embodiments. Housing 510 can include electrical coupling interface 530 and notches 539. Electrical coupling interface 530 can include a number of concentric and independent electrical traces ("concentric traces") that can couple to one or more pins on a base unit (e.g., see pins 351 of base unit 350A in FIG. 3). The concentric traces may be electrically configured in any suitable manner (e.g., the traces can be internally coupled together, routed to different components, busses, ports, and the like). Referring to FIG. 5B, eight traces (e.g., traces 531-538) are shown and can be configured to receive or output any suitable signal including, but not limited to, data lines (e.g., USB data+, USB data−), power lines (e.g., power+, power−), electrical ground lines, general purpose input/output ("I/O") lines, or may be floating (e.g., unused). Some embodiments may include multiple voltage lines (e.g., 12 V and 5 V), additional data lines, auxiliary outputs, and the like. One of ordinary skill in the art would understand the many variations, modifications, and alternative embodiments thereof.

Notches 539 may operate to secure a base unit to the back of housing 510, while still allowing the base unit to rotate freely with respect to housing 510, according to certain embodiments. The notch width, location, dimensions, and the like, can dictate what types of attachments can be rotatably coupled to housing 510. For example, a first camera system may be designed for indoor use only, and a second camera system may be suitable for both outdoor and indoor use (e.g., the second camera may include a more rugged, waterproof housing, better optics, etc.). In some embodiments, notches 539 may be designed in the first camera to only allow indoor-type accessories (e.g., base units, lens upgrades, etc.) to attach to it, while the second camera may have notches that allow both indoor and outdoor attachments (e.g., telescoping lenses, visors, etc.) to couple thereto for greater modular flexibility. In another example, some lower end camera systems (e.g., lower resolution imaging, fewer operational features, or lower quality construction, etc.) may have notches 539 configured such that only similarly graded attachments (e.g., base units, attachable speakers/microphones, etc.) can be rotatably coupled to the housing (while higher-graded compounds cannot), while certain higher end camera systems (e.g., high resolution cameras, richer feature selection, etc.) may have notches 539 configured such that no restrictions with respect to attachments apply (e.g., any attachment regardless of quality can be rotatably coupled to housing 510). One of ordinary skill in the art with the benefit of this disclosure would understand the many variations, modifications, and alternative embodiments thereof.

Figure 6:
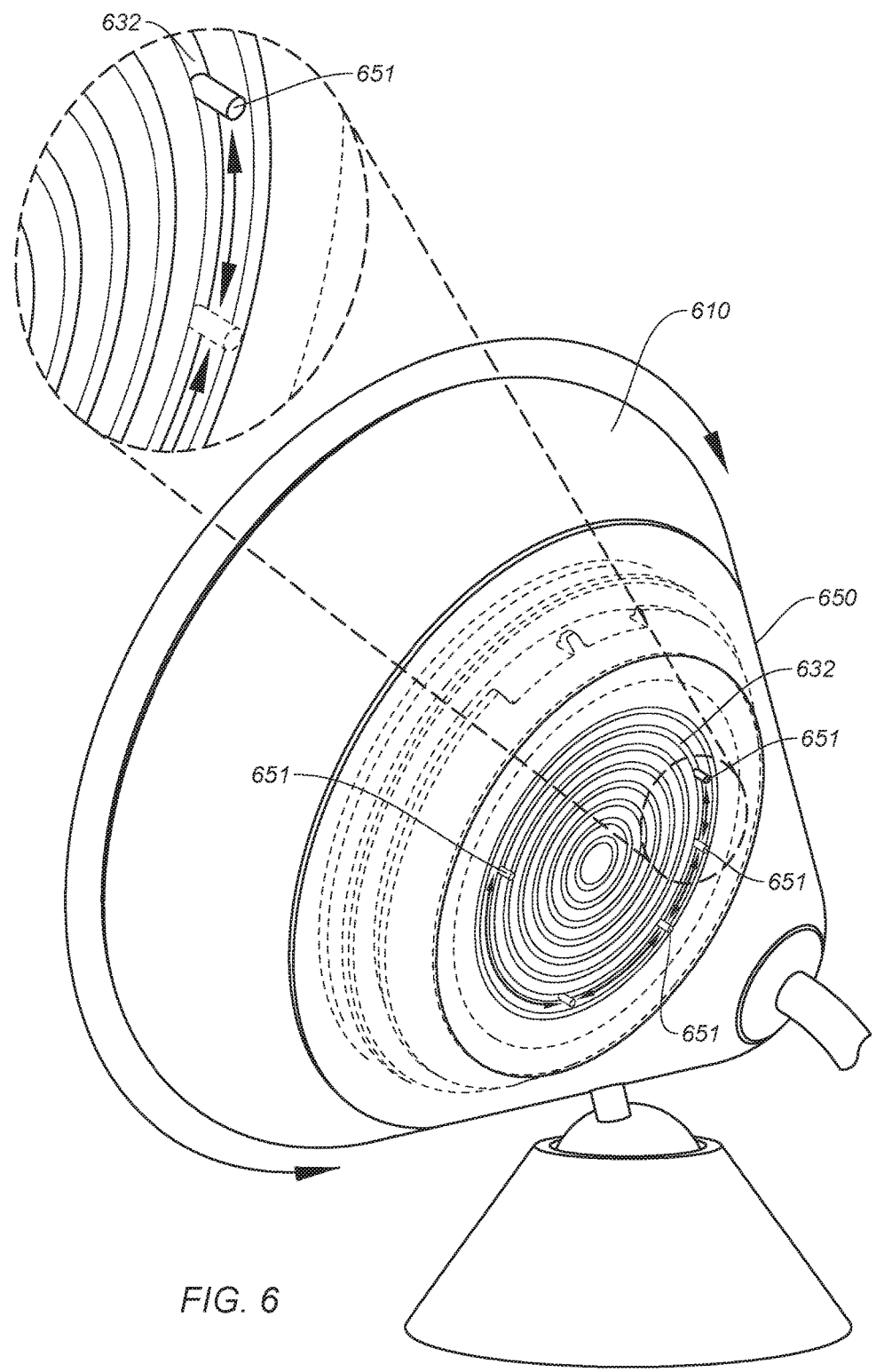
FIG. 6 shows how one or more contacts from a base unit remains in electrical contact with a concentric trace on a video camera system housing as the housing is rotated, according to certain embodiments.

The combination of the concentric electrical traces of electrical coupling interface 530 and notches 539 provide the advantage of allowing a base unit to be mechanically and rotatably coupled to housing 510, and electrically coupled to one or more concentric traces of electrical coupling interface 530, such that the electrical contact between the one or more pins of the base unit and the corresponding concentric traces are not broken when the base unit is rotated with respect to housing 510, as shown in FIG. 6. Note that as housing 510 and/or a base unit are rotated with respect to each other, the physical and electrical contact between the pins of the base unit and housing 510 remain in contact. By way of illustration, FIG. 6 shows how housing 610 can rotate with respect to base unit 650 while still maintaining electrical contact between base unit pins 651 and corresponding concentric traces 632, according to certain embodiments.

As indicated above, housing 510 is configured to be coupled to different components on the back (e.g., see base units of FIGS. 4A-4F) that have different electrical connections (e.g., using different combinations of base unit pins and concentric traces). These different combinations of pins and traces can be used (e.g., by processor 710) to determine functionality in the camera system. As indicated above, the notches can also be used to restrict and/or enable certain accessories from coupling to housing 510. On the front side of housing 510, different lenses, window mounts, etc., can be coupled to housing 510. In some embodiments, the myriad types of base units, accessories, and attachments may be coupled to housing 510 in a manner that is in axial alignment with lens 520. For example, a center of lens 520 can define a central axis that some or all components (e.g., base units, window mounts) are mounted on housing 510 such that they are axially aligned with lens 520.

System for Operating Aspects of a Modular Video Camera System

Figure 7:
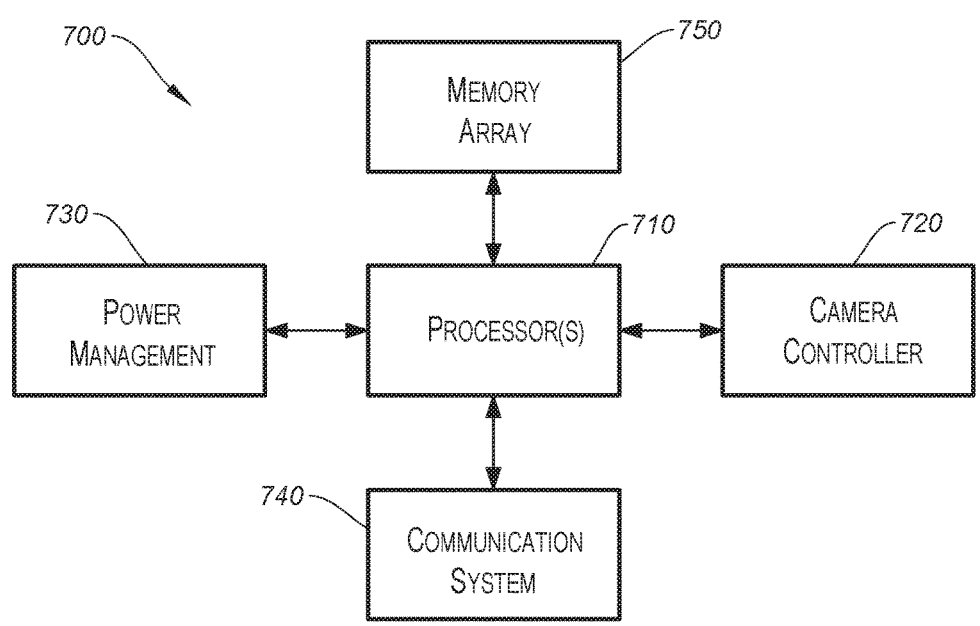
FIG. 7 is a simplified block diagram of system configured to operate a modular video camera system, according to certain embodiments.

FIG. 7 is a simplified block diagram of system 700 configured to operate a modular video camera system, according to certain embodiments. System 700 can include processor(s) 710, camera controller 720, power management system 730, communication system 740, and memory array 750. Each of system blocks 720-750 can be in electrical communication with processor(s) 710. System 700 may include more or fewer systems, as would be appreciated by one of ordinary skill in the art, and are not shown or discussed to prevent obfuscation of the novel features described herein. System blocks 720-750 may be implemented as separate modules, or alternatively, two or more system blocks may be combined in a single module. For instance, some or all of system blocks 720-750 may be subsumed by processor(s) 710. System 700 and variants thereof can be used to operate the camera mounting devices described and depicted throughout this disclosure (e.g., FIGS. 1-6 and 8-21). It should be understood that references to specific camera systems when describing aspects of system 700 are provided for explanatory purposes and should not be interpreted as limiting to any particular embodiment. System 700 can be contained in housing 510 in whole or in part, as would be understood by one of ordinary skill in the art.

In certain embodiments, processor(s) 710 may include one or more microprocessors (μCs) and may control the operation of system 700. Alternatively, processor(s) 710 may include one or more microcontrollers (MCUs), digital signal processors (DSPs), or the like, with supporting hardware and/or firmware (e.g., memory, programmable I/Os, etc.), as would be appreciated by one of ordinary skill in the art. In some embodiments, processor(s) 710 may be configured to control aspects of charging controls, media controls, and the like.

Camera controller 720 may be configured to control aspects of a modular video camera system for any of the embodiments shown and described, at least in FIGS. 1-6 and 8-21, according to certain embodiments. In some aspects, camera controller 720 may control lens 520 operations including focus control, zoom control, movement control (e.g., individual movement of the lens), or the like. In some implementations, camera controller 720 can receive sensor data including ambient visible light detection, ambient IR light detection, audio data (e.g., from an on-board microphone), or the like.

In some embodiments, camera controller 720 can control the image quality generated by a modular video camera system (300). For example, the image quality of still images or video can be reduced (e.g., low-definition) when low-bandwidth conditions exist, and increased (e.g., high-definition) when high-bandwidth conditions exist. One of ordinary skill in the art would understand the many variations, modifications, and alternative embodiments thereof.

Memory array 750 can store information such as camera control parameters, communication parameters, or the like. Memory array 750 may store one or more software programs to be executed by processors (e.g., processor(s) 710). It should be understood that "software" can refer to sequences of instructions that, when executed by processor(s), cause system 700 to perform certain operations of software programs. The instructions can be stored as firmware residing in read-only memory (ROM) and/or applications stored in media storage that can be read into memory for processing by processing devices (processor(s) 710). Software can be implemented as a single program or a collection of separate programs and can be stored in non-volatile storage and copied in whole or in-part to volatile working memory during program execution. Memory array 750 can include random access memory (RAM), read-only memory (ROM), long term storage (e.g., hard drive, optical drive, etc.), and the like, as would be understood by one of ordinary skill in the art.

Power management system 730 can be configured to manage power distribution between systems (blocks 710-750), mode operations, power efficiency, and the like, for the various modular video camera system described herein. In some embodiments, power management system 730 can include one or more energy storage devices (e.g., batteries—not shown), a recharging system for the battery (e.g., using a USB cable), power management devices (e.g., voltage regulators), or the like. In certain embodiments, the functions provided by power management system 730 may be incorporated into processor(s) 710. An energy storage device can be any suitable rechargeable energy storage device including, but not limited to, NiMH, NiCd, lead-acid, lithium-ion, lithium-ion polymer, and the like. Alternatively or additionally, energy storage devices can be housed in certain base units, such as base unit 440 of FIG. 4D. Energy storage devices may be recharged via a cable (e.g., USB cable, data cable, dedicated power supply cable, etc.), or inductive power coupling.

Communication system 740 can be configured to provide wired (e.g., via a power/data cable) and/or wireless communication between camera system 300 and one or more external computing devices, peripheral devices, remote servers, local or remotely located routing devices, or the like. Some non-limiting examples of communication between camera mounting device and an external computing device can include camera control operations, communicating status updates including memory capacity and usage, operational properties (e.g., camera specifications, mode of operation, etc.) and the like. Communications system 740 can be configured to provide radio-frequency (RF), Bluetooth, infra-red, ZigBee, or other suitable communication protocol to communicate with other computing devices. In some embodiments, a data cable can be a USB cable, FireWire cable, or other cable to enable bi-directional electronic communication between video camera system 300 and an external computing device. Some embodiments may utilize different types of cables or connection protocol standards to establish hardwired or wireless communication with other entities.

Although certain necessary systems may not expressly discussed, they should be considered as part of system 700, as would be understood by one of ordinary skill in the art. For example, system 700 may include a bus system to transfer power and/or data to and from the different systems therein.

It should be appreciated that system 700 is illustrative and that variations and modifications are possible. System 700 can have other capabilities not specifically described herein. Further, while system 700 is described with reference to particular blocks (710-750), it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks may or may not be reconfigurable depending on how the initial configuration is obtained.

Quick Release Battery Pack

Figure 8:
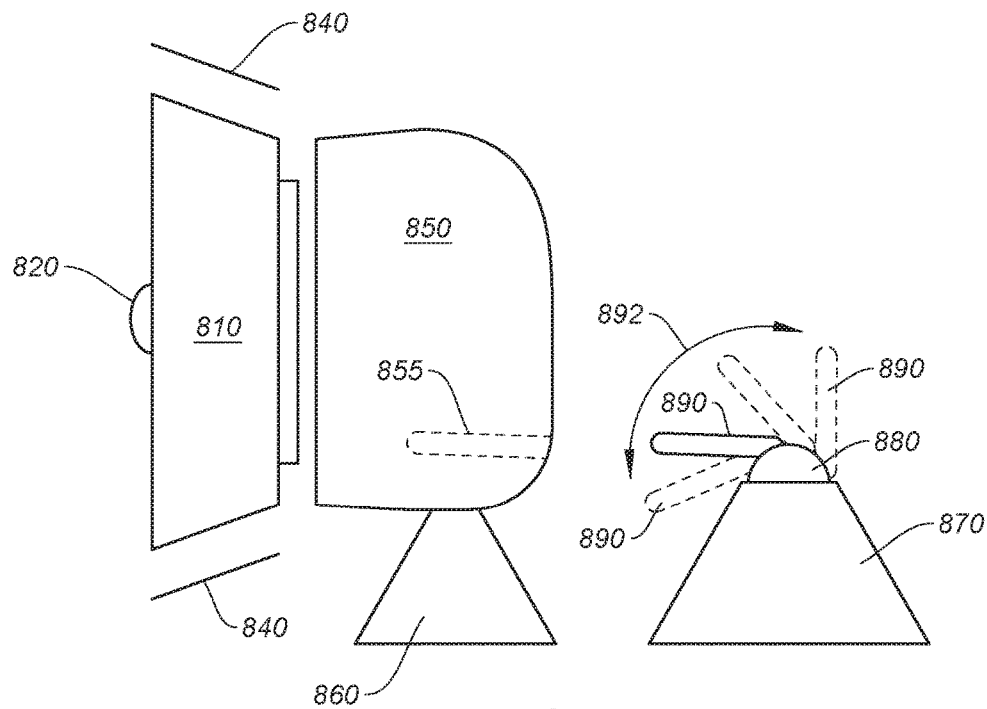
FIG. 8 shows a modular video camera system with a battery pack, according to certain embodiments.

FIG. 8 shows aspects of a battery module for a modular video camera system 800, according to certain embodiments. Camera system 800 can include housing 810 having lens 820, electrical coupling interface 830 (e.g., including concentric electrical traces), and notches 839 (not shown), cover 840, base unit 850, base support 860 or alternatively base support 870.

Housing 810 can be electrically and rotatably coupled to base unit 850, as described above with respect to FIG. 5B. Base unit ("battery pack") 850 can include a number of electrical contacts (not shown) that may couple to and maintain electrical contact with certain concentric electrical traces of housing 810 as housing 810 is rotated. Battery pack 850 can include one or more energy storage devices (e.g., batteries) disposed inside to provide power to camera system 800 without the need of a hard-wired power cable. In some embodiments, battery pack 850 may have a substantially flat-bottomed design such that it can sit securely on a surface without rolling away. Alternatively or additionally, battery pack 850 can include a threaded sleeve 965 (see FIG. 9) to receive base support 860 (e.g., a tri-pod or other suitable support mechanism), which can be fixed (e.g., via threaded screw) or adjustable (e.g., threaded screw extending from a ball-and-socket joint). In further embodiments, battery pack 850 can include slot 855 to receive a shaft (e.g., tongue) 890 extending from ball-and-socket joint 880 of base support 870. Ball-and-socket joint 880 may be adjustable over a range of motion, as shown. The range of motion can vary by design, as would be understood by one of ordinary skill in the art.

Figure 9:
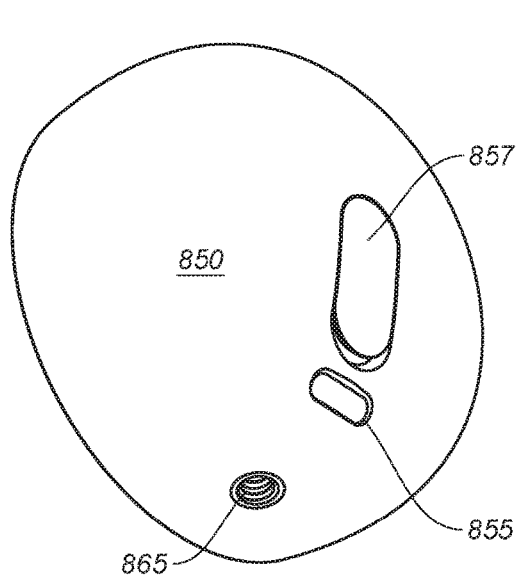
FIG. 9 shows aspects of a battery pack for a modular video camera system, according to certain embodiments.

FIG. 9 shows additional aspects of battery pack 850, according to certain embodiments. Battery pack 850 can include a threaded sleeve 865 to receive a threaded screw and a corresponding base support (870). In some embodiments, battery pack 850 can include charging port 857, which can be configured to accommodate any suitable communication protocol (e.g., USB, FireWire, etc.) that can provide power to recharge the one or more energy storage devices disposed in battery pack 850. In some embodiments, battery pack 850 may further include slot 855 to receive tongue 890 of base support 870. Tongue 890 can be fixed and may extend from the ball-and-socket joint 880 of base support 870. In some cases, slot 855 can receive tongue 890 to couple and secure battery pack 850 to base support 870 such that an orientation of battery pack 850 with respect to base support 870 is adjustable according to the range of motion of ball-and-socket joint 880. The tongue can be interchangeably referred to as a "shaft."

In certain embodiments, tongue 890 can be held inside slot 855 by a mechanical friction such that a first friction has to be overcome by a first force to insert and remove tongue 890 from slot 855. In some embodiments, the first friction may range from 0.9-1.15 kgf, however other ranges are possible, as would be understood by one of ordinary skill in the art. In some cases, ball-and-socket joint 880 of base support 870 may have a second friction that has to be overcome by a second force in order to rotate ball-and-socket joint 880 along its range of motion. In such embodiments, the second friction can be greater than the first friction such that coupling (inserting) or decoupling (removing) battery pack 850 from base support 870 (via tongue 890/slot 855) with a force greater than the first friction and less than the second friction does not cause the ball-and-socket joint to rotate. This can be desirable if, for example, camera system 800 is configured in a preferred orientation and the user does not want the orientation to change when battery pack 850 (along with housing 810) is frequently removed and re-inserted for recharging sessions. This is further discussed below with respect to FIG. 21.

Figure 10:
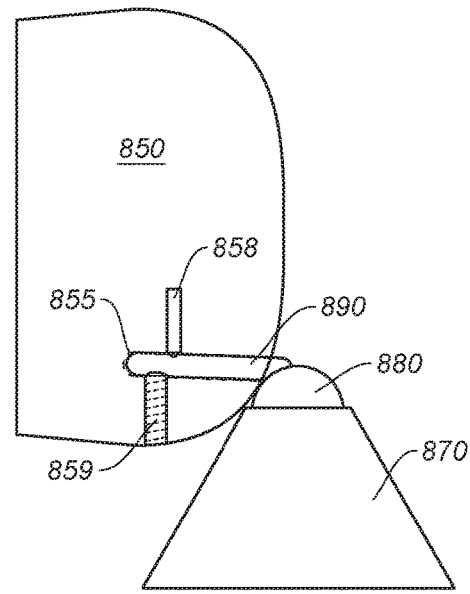
FIG. 10 shows aspects of a locking mechanism for a battery pack in a modular video camera system, according to certain embodiments.

FIG. 10 shows aspects of various securing mechanisms for battery pack 850 in a modular video camera system 800, according to certain embodiments. Battery pack 850 can include slot 855 to receive tongue 890 of base support 870, in addition to other modular attachments, as would be understood by one of ordinary skill in the art. In some cases, different locking or securing mechanisms can be used to hold tongue 890 inside slot 855 with varying amounts of force. For instance, some implementations may use a shaft disposed within battery pack 850 and configured perpendicular to slot 855 (e.g., shafts 858 and 859). Shaft 858 can include a fixed insert with a spring loaded pin or protrusion that can be configured to engage with a hole or concavity on tongue 890 to provide an additional force to secure battery pack 850 to base support 870. For the purpose of clarification, the coupling between shaft 858 and tongue 890 can be similar to that of a socket coupled to a socket wrench. In that case, a socket is guided onto a socket wrench drive square and held in place by a spring loaded protrusion the provides a force to hold the socket in place. Shaft 858 and tongue 890 can work in a similar manner.

Alternatively or additionally, shaft 859 can be used to provide a more enduring or locked connection between tongue 890 and slot 855. Shaft 859 may be configured to receive a threaded screw that may engage tongue 890 to temporarily lock battery pack 850 to base support 870. For example, tongue 890 may have a hole or concavity to receive the threaded screw, such that tongue 890 cannot be moved without backing out or removing the screw. Locking battery pack 850 to base support 870 may prevent unwanted removal (e.g., by an inadvertent contact) or theft. In some embodiments, shaft 859 may be similar to threaded sleeve 865. In that case, threaded sleeve can serve multiple purposes including receiving base support 860 or receiving a locking screw to secure tongue 890 within slot 855. One of ordinary skill in the art would understand the many variations, modifications, and alternative embodiments thereof.

Window-Mounted Video Camera System

Figure 11:
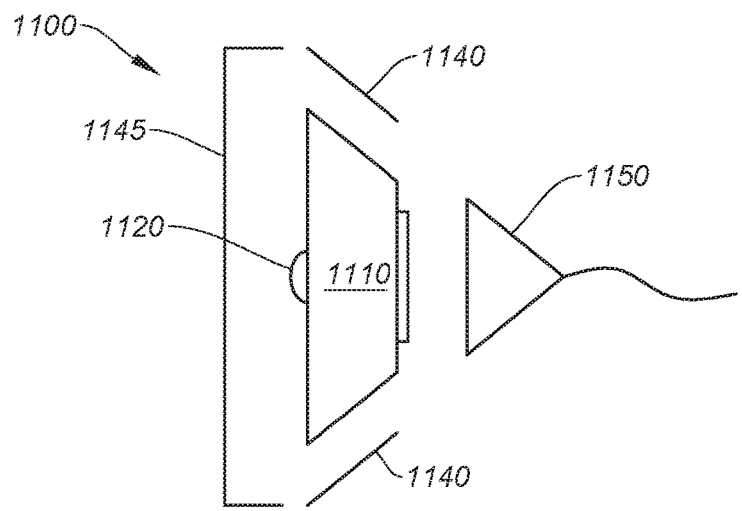
FIG. 11 shows an abstracted representation of a window mounting module for a modular video camera system, according to certain embodiments.

FIG. 11 shows aspects of a window mounting apparatus for a modular video camera system 1100, according to certain embodiments. Camera system 1100 can include housing 1110 with lens 1120, cover 1140, window mounting module ("mounting apparatus") 1145, and base unit 1150, in addition to other modular attachments, as would be understood by one of ordinary skill in the art.

Housing 1110 can be electrically and rotatably coupled to base unit 1150, as described above with respect to FIG. 5B. Base unit 1150 can include a number of electrical contacts (not shown) that may couple to and maintain contact with certain concentric electrical traces of housing 1110 as housing 1110 is rotated (see, e.g., FIG. 6). Base unit 1150 can be any suitable modular attachment including hardwired cone-type attachments (see, e.g., FIG. 4E), wireless attachments (see, e.g., battery pack 440 of FIG. 4D), or the like. One of ordinary skill in the art would understand the many variations, modifications, and alternative embodiments thereof.

Cover 1140 and mounting apparatus 1145 may be separate entities or may be integrated into a single mounting apparatus. In some embodiments, cover 1140 may serve as an ornamental covering for housing 1110, or may function as an interface to couple mounting apparatus 1145 with housing 1110. One of ordinary skill in the art would understand the many variations, modifications, and alternative embodiments thereof.

Figure 12:
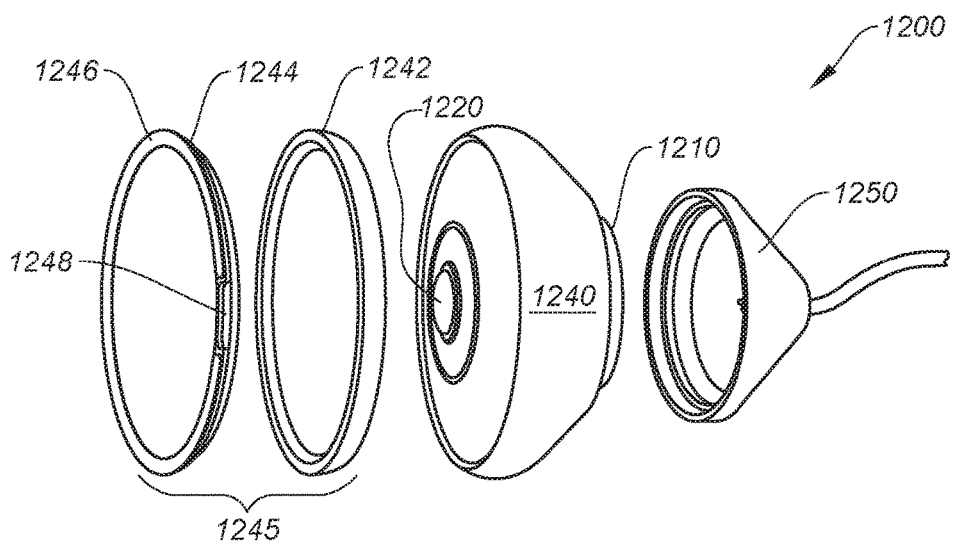
FIG. 12 shows an exploded view of a window mounting module for a modular video camera system, according to certain embodiments.

FIG. 12 shows an exploded view of a window mounting apparatus for modular video camera system 1200, according to certain embodiments. Camera system 1200 includes housing 1210, cover 1240, base unit 1250, and mounting apparatus 1245, which may include housing interface 1242 and mounting ring 1244. In some aspects, mounting ring 1244 may include a micro-suction disk 1246 and manual release aperture 1248.

As shown in FIG. 12, mounting ring 1244 is coupled to housing 1210 via housing interface 1242. In some embodiments, mounting ring 1244 and housing interface 1242 may be integrated into a single component, or can be further combined with cover 1240. Mounting ring 1244 can be coupled to a window via micro-suction disk 1246, which can provide a strong enough vacuum seal to support the weight of camera system 1200. Manual release aperture 1248 can be accessed to lift and remove camera system 1200 from a window (i.e., break a vacuum seal between micro-suction disk 1246 and a window pane). Other types of manual release apertures maybe employed. For example, a button, notch, bubble, or other feature may be configured such that it can be pushed against the window pane to release the suction coupling between micro-suction disk 1246 and the corresponding window. In some cases, there may simply be an opening to receive a screwdriver, knife, fingernail, or other tool to pry the mounting ring off of the window and break the vacuum seal. In such cases, it can be more apt to refer to the release aperture as a "release mechanism," which may be used interchangeably throughout this document, with the understanding that both refer to a feature that allows a user to decouple the modular video camera system from a window pane. In some aspects, different window interfaces can be used including other vacuum-based solutions (e.g., suction cups), adhesive (tape or glue), or the combination thereof. One of ordinary skill in the art would understand the many variations, modifications, and alternative embodiments.

Night Vision on Window-Mounted Video Camera Systems

Some higher end contemporary video camera systems include some type of night-vision capability that typically involves the use of IR light (invisible to human sight) for image capture and, in some systems, motion capture capabilities in low-light environments. One problem with contemporary night vision systems (e.g., placed indoors and facing out of a window pane) is that IR light (typically emitted by the camera system) is reflected off the window pane and back into the camera lens, which can cause significant interference and reduce the quality of the detected image. Certain embodiments of the invention can significantly reduce or eliminate this problem.

Figure 13:
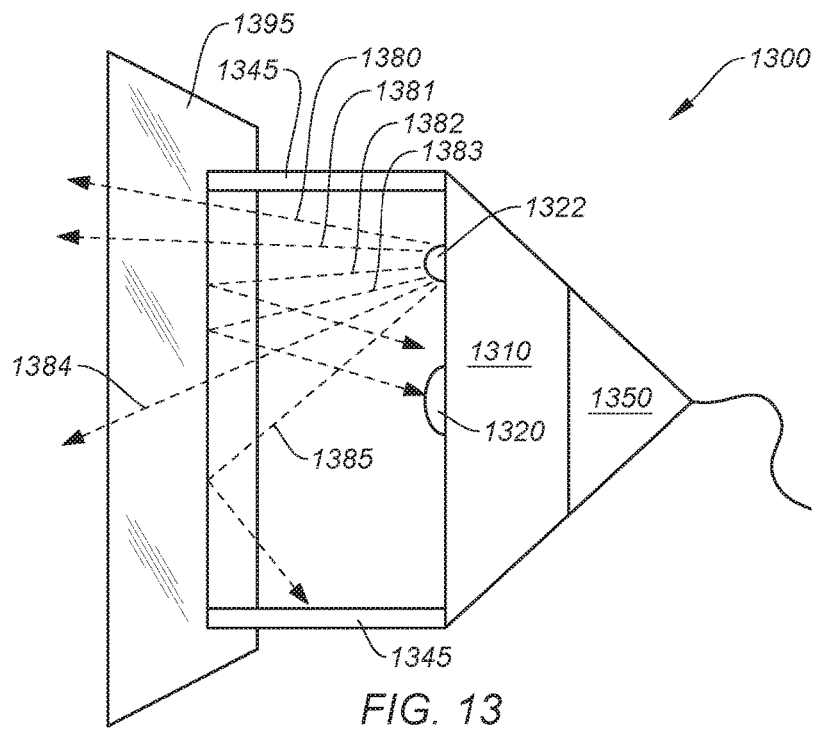
FIG. 13 shows operational aspects of a window-mounted modular video camera system using night vision, according to certain embodiments.

FIG. 13 shows aspects of modular video camera system 1300 mounted to window pane 1395, according to certain embodiments. Camera system 1300 can include housing 1310, base unit 1350 rotatably and electrically coupled to housing 1310, mounting apparatus 1345, and window pane 1395. Housing 1310 can include lens 1320 and IR emitter 1322. IR emitter 1322 is typically a high-powered light emitting diode (LED) to illuminate an area in front of housing 1310 in IR light. Lens 1320 can detect images and, in some embodiments, motion based on the IR light that bounces off various objects, surfaces, etc., and reflects back into lens 1320. Unlike ambient visible light, which can be produced by many sources (e.g., the sun, light bulbs, fire, moonlight, etc.), IR light is typically not naturally present in an ambient setting, so night vision can be dependent, in large part, to detecting the IR light originating from IR emitter 1322. In some embodiments, two or more IR emitters can be used. In some cases, IR emitter(s) 1322 may be integrated with housing 1310, separate from housing 1310 (e.g., a standalone IR LED circuit), and a combination thereof (e.g., in arrays of multiple IR LEDs). Note that the dimensions of FIG. 13 (and FIGS. 15-17) are not to scale (e.g., lens 1320 would typically be much closer to window pane 1395) and are presented in this manner for explanatory purposes.

Figure 14:
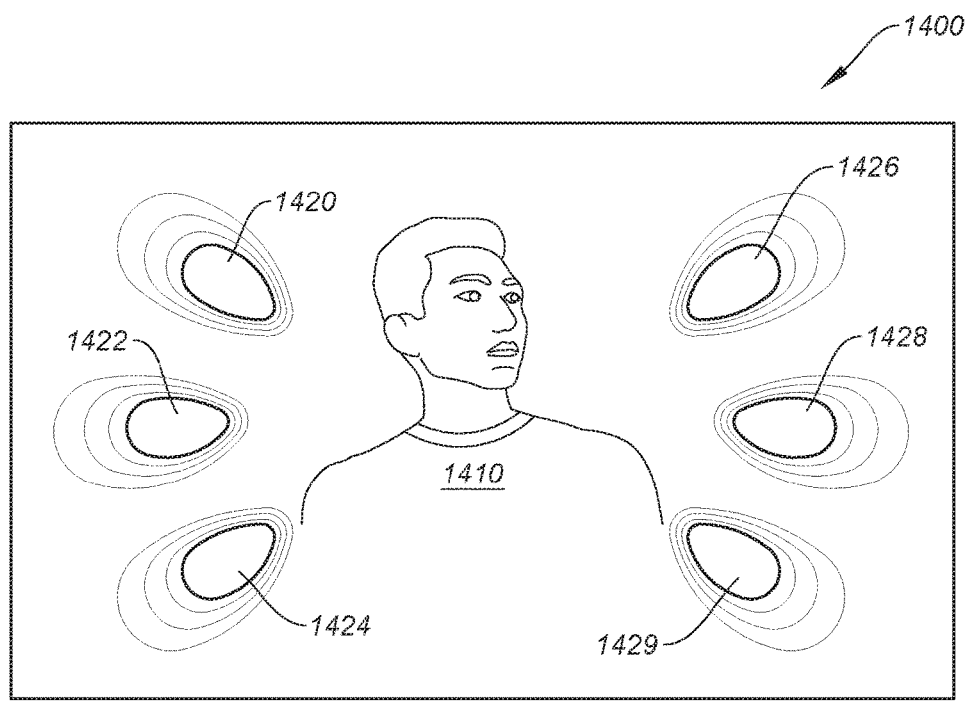
FIG. 14 shows operational aspects of a window-mounted modular video camera system using night vision, according to certain embodiments.

Referring back to FIG. 13, IR emitter 1322 emits IR light, as represented by IR light beams 1380-1385. When the IR light beams reach window pane 1395, some of the IR light beams (1382, 1383, 1385) may be reflected. In some cases, the reflected IR light beams (1382, 1383) may be directed to lens 1320, which can cause interference, light flares, and other unfavorable artifacts that can reduce the quality of a detected image. By way of example, FIG. 14 shows a typical result with a window-mounted camera system using IR emitters in a night vision mode of operation. In this case, a person 1410 is shown in the center of display 1400. As can be readily seen, IR light from six IR emitters configured around the camera lens is reflected off the window pane and back into the lens, which may appear as lens flares, interference, or other video artifact. In some cases, the image can still be recognizable, but the IR interference may still be evident.

FIG. 15 shows aspects of an enhancement to improve night vision in a window-mounted modular video camera system 1500, according to certain embodiments. In some embodiments, IR light reflections off of a corresponding window pane can be reduced or eliminated all by introducing a silicone material between the IR emitter and the window pane. The silicone material can be pure silicone or any suitable silicone-based compound (e.g., partially silicone) that is translucent to IR light. In some embodiments, non-silicone materials that are IR-transparent can be used. Generally, materials that are IR-transparent and not insulators are preferred. Camera system 1500 can include housing 1510 with lens 1520 and IR emitter(s) 1522, base unit 1550 mechanically (rotatably) and electrically coupled to housing 1510, cover 1540, mounting apparatus 1545 coupled to window pane 1595, and silicone compound 1590 configured between IR emitter(s) 1522 and window pane 1595, according to certain embodiments. In some aspects, silicone compound 1590 can be configured such that no gaps are formed between IR emitter 1522 and window pane 1595. Generally, silicone compound 1590 can be configured in any suitable manner (e.g., attached to housing 1510 or cover 1540, "floating" between housing 1510 and window pane 1595, etc.), as would be understood by one of ordinary skill in the art.

In FIG. 16, IR emitter 1522 emits IR light beams 1580-1584, according to certain embodiments. Light beams travel through silicone compound 1590 unimpeded (or partially unimpeded) as silicone is translucent to IR light. IR light beams 1580-1583 remain in silicone compound 1590 as they travel to window pane 1595 and pass through without reflecting. In contrast, IR light beam 1584 exits silicone compound 1590 and reflects off of window pane 1595 and back generally towards housing 1510. Thus, IR light beams that do not remain within silicone compound 1590 before reaching window pane 1595 may be reflected back, as discussed above with respect to FIGS. 13-14. To prevent IR light beams from exiting silicone compound 1590, a border of silicone compound can be made opaque, such that IR light beams do not pass through. In some embodiments, the border may be reflective to cause IR light beams to reflect back into the silicone compound. In some embodiments, the border of silicone compound 1590 can be painted or coated with a black pigmentation, opaque material or compound, or the like. One of ordinary skill in the art would understand the many variations, modifications, and alternative embodiments thereof.

FIG. 17 shows aspects of an enhancement to improve night vision in a window-mounted modular video camera system, according to certain embodiments. Camera system 1700 can include housing 1710 with lens 1720 and IR emitter(s) 1722, base unit 1750 rotatably and electrically coupled to housing 1710, cover 1740, mounting apparatus 1745 coupled to window pane 1795, and silicone compound 1790 configured between IR emitter(s) 1722 and window pane 1795. In some embodiments, silicone compound 1790 is configured such that no gaps are formed between IR emitter 1722 and window pane 1795. Silicone compound 1790 can include opaque borders 1792 to prevent IR light beams from IR emitter(s) 1722. IR light beams 1780-1785 can be emitted by IR emitter(s) 1322 and can travel through silicone compound 1790. IR light beams 1780-1783 traverse silicone compound 1790 and pass through window pane 1795 without reflecting off due to the properties of silicone.

However, IR light beams 1784-1785 may contact opaque border 1792, which can prevent the IR light beams from exiting silicone compound 1790. In some cases, border 1792 may absorb the IR light beams, or reflect the IR light beams back into the silicone compound, as would be understood by one of ordinary skill in the art with the benefit of this disclosure. In some embodiments, the silicon compound (1890) can be pressure fit or squeeze fit to fill the void between the corresponding IR emitter (not shown) on housing 1810 and the pane of glass 1895, as shown in FIG. 18. The silicone compound can be coupled to the camera system in any suitable fashion. For instance, silicone compound 1990 may be coupled to housing 1910 in the manner shown in FIG. 19. One of ordinary skill in the art would understand the many variations, modifications, and alternative embodiments of coupling a silicone compound to a camera housing. Note the placement of a silicone compound covers the IR emitter, but typically does not obstruct the camera lens. By way of example, FIG. 20 shows a result using certain embodiments of a window-mounted camera system using IR emitters in a night vision mode of operation. In this case, person 2010 is displayed in the center of display 2000, which is generated by a night vision system using six IR emitters (not shown) configured around the camera lens. In contrast to FIG. 14, IR light emitted by the six IR emitters are not visible (see areas 2020 where the IR light reflections would normally be without the silicone compound) as the IR light beams are not reflected off the window pane and into the lens.

Figure 21:
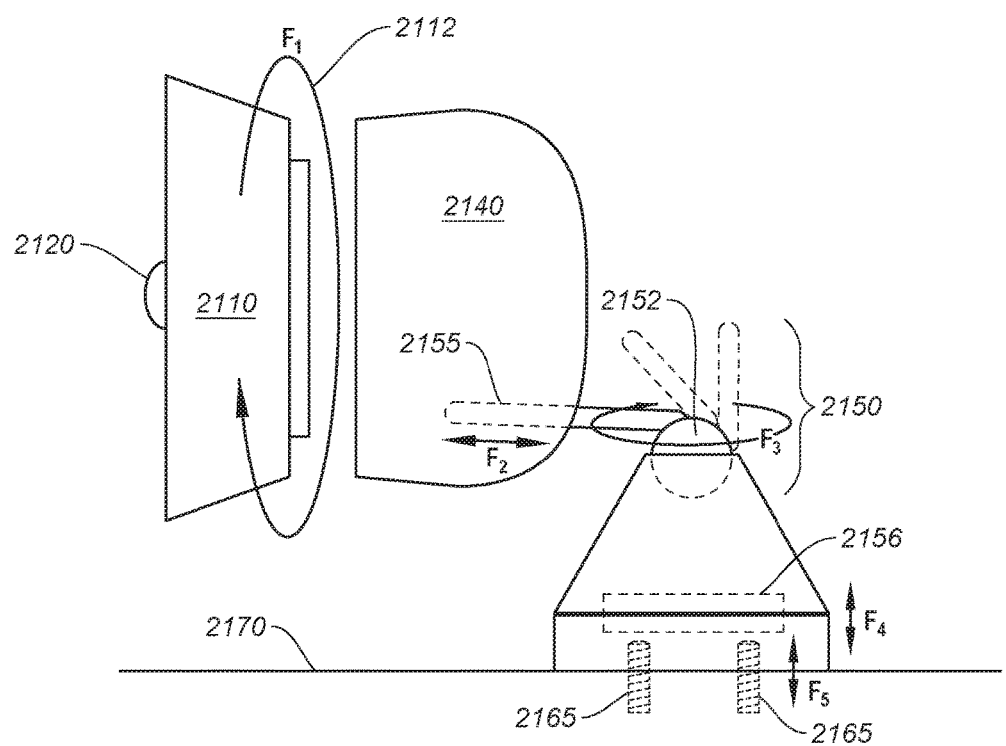
FIG. 21 shows aspects of a modular video camera system with staged friction levels, according to certain embodiments.

FIG. 21 shows aspects of a modular video camera system 2100, according to certain embodiments. Camera system 2100 can include housing 2110 rotatably coupled to base unit 2140. Housing 2110 may include lens 2120. Base unit 2140 (e.g., battery pack) may include slot 2155. In some embodiments, base unit 2140 can be coupled to base support 2150 via a tongue or shaft 2154 extending from an adjustable apparatus (e.g, ball-and-socket joint) 2152 of base support 2150 that is inserted or removed from slot 2155 of base unit 2140, according to certain embodiments. The adjustable apparatus can have any suitable range of motion with respect to base support 2150. In some aspects, base support 2150 may be coupled to surface mount 2160 via a quick release mechanism, and surface mount 2160 may be coupled to a surface 2170 via hardware 2165 (e.g., screws, bolts, etc.). Note that "tongue" or "shaft" may be used interchangeably. I some cases, the base unit can be a battery pack, a backing (e.g., cone, or other modular attachment to couple to the back of housing 2110) with a cord for a wall socket, a directly coupled wall socket, a wall mount, a surface mount, or the like (see, e.g., FIGS. 4A-4F).

In some aspects, force F1 may define a minimum force to cause housing 2110 to rotate with respect to base unit 2140, which can typically range from 0.5-0.74 kgf, although other values and/or ranges can be used. Force F2 may define a minimum force to couple and decouple shaft 2154 from slot 2155, which can typically range from 0.9-0.55 kgf, although other values and/or ranges can be used. Force F3 may define a minimum force to rotate the adjustable apparatus (e.g., ball joint), which can typically range from 0.5-0.55 kgf with housing 2110 and base unit 2140 (e.g., battery pack) attached to base support 2150, or 0.9-1.0 kgf without housing 2110 or base unit 2140 attached to base support 2150, although other values and/or ranges can be used. Force F4 may define a minimum force to cause quick release mechanism 2156 (e.g., on a wall bracket) to release from surface mount 2160 (e.g., ball joint mount base), which can typically range from 4-5.6 kgf, although other values and/or ranges can be used. Force F5 may define a minimum force to cause surface mount 2160 to detach from surface 2170, which may be very high, as screws or nails fastened to a wall stud or screwed into dry wall can typically support 30+kg, so a force to remove it may even exceed 100 kgf in some cases, although other values and/or ranges can be used, as would be understood by one of ordinary skill in the art.

Certain embodiments may be configured so that the force increases from the front of camera system 2100 to the back. For instance, configuring forces F1-F5 such that F1<F2<F3<F4<F5 can ensure that rotating housing 2110 (F1) does not cause base unit 2140 to couple or decouple from shaft 2154 (F2), which in turn does not cause adjustable apparatus 2152 to rotate along its range of motion (F3), which in turn does not cause base support 2150 from releasing from surface mount 2160 (F4), which in turn does not cause surface mount 2160 to decouple from surface 2170. Some embodiments may include more or fewer forces that can be arranged in any number of different configurations, as would be understood by one of ordinary skill in the art. In one exemplary embodiment, a video camera system includes camera housing 2110 including a camera disposed in camera housing 2110, a base unit 2140 including a slot disposed therein, the base unit rotatably coupled to camera housing 2110 such that camera housing 2110 can rotate with respect to the base unit on an axis, and a base support including a tongue extending from an adjustable apparatus 2150 that can rotate over a range of motion, where the tongue can be inserted and removed from the slot of the base unit to couple and decouple the base support from the base unit, and where the minimum force to insert or remove the tongue of the base support from the slot of the base unit is less than a minimum force to rotate the adjustable apparatus of the base support such that inserting or removing the tongue from the slot does not cause the adjustable apparatus to rotate. Any modular attachments can be configured in a similar manner. For example, any first modular attachment may be configured to be adjustable/removeable in response to force that does not cause a next component (e.g., housing, base unit, modular attachment, etc.) to move. One of ordinary skill in the art would understand the many variations, modifications, and alternative embodiments thereof.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A video camera system comprising:
    a modular attachment configured to couple to a video camera housing, the modular attachment including a slot extending into the modular attachment; and
    a base support including:
        a ball-and-socket joint providing a range of motion for the base support; and
        a tongue fixed to the ball-and-socket joint and extending therefrom,
    wherein the slot is configured to receive the tongue such that the modular attachment couples and secures to the base support,
    wherein the tongue is held within the slot according to a first friction,
    wherein a motion of the ball-and-socket joint rotates according to a second friction,
    wherein the second friction is greater than the first friction such that coupling or decoupling the modular attachment from the base support with a force greater than the first friction and less than the second friction does not cause the ball-and-socket joint to rotate, and
    wherein an orientation of the modular attachment with respect to the base support is adjustable according to the range of motion of the ball-and-socket joint.

2. The video camera system of claim 1 wherein the modular attachment includes a shaft disposed internally and configured perpendicular to the slot, wherein the tongue includes a concavity configured to receive the shaft that secures the tongue inside the slot.

3. The video camera system of claim 2 wherein the shaft includes a spring-loaded pin providing a force which secures the tongue inside the slot.

4. The video camera system of claim 2 wherein the shaft includes a threaded screw configured to secure the tongue inside the slot.

5. The video camera system of claim 1 wherein the modular attachment includes a plurality of electrical contacts, and wherein the modular attachment is configured to couple to the camera housing via an interface on the camera housing that includes:
    a plurality of concentric electrical traces disposed in a back side of the camera housing; and
    a notched mounting apparatus disposed on the back side of the camera housing,
    wherein the notched mounting apparatus is operable to receive and secure the modular attachment to the camera housing such that the modular attachment is mechanically and rotatably coupled to the camera housing, and
    wherein one or more of the concentric electrical traces are configured to contact one or more of the plurality of electrical contacts of the modular attachment and remain in contact with the one or more of the plurality of electrical contacts as the camera housing is rotated with respect to the modular attachment.

6. The video camera system of claim 1 wherein the modular attachment is a battery pack configured to provide power to the video camera system.

7. A video camera system comprising:
    a battery pack configured to couple to a video camera, the battery pack including:
        an energy storage device to store an electrical charge;
        an electrical interface to electrically couple the battery pack to the video camera; and
        a slot extending into the battery pack,
    wherein the slot is configured to receive a tongue fixed to a ball of a ball-and-socket joint extending from a base support apparatus, and
    wherein the slot is configured to secure the battery pack to the base support.

8. The video camera system of 7 wherein the tongue is retained in the slot via a frictional fit.

9. The video camera system of 7 wherein the battery pack includes a shaft disposed internally and configured perpendicular to the slot, and
    wherein the shaft is configured to couple to a concavity in the tongue to secure the tongue inside the slot.

10. The video camera system of claim 9 wherein the shaft includes a spring-loaded pin providing a force that secures the tongue inside the slot.

11. The video camera system of claim 9 wherein the shaft includes a threaded screw configured to secure the tongue inside the slot.

12. The video camera system of claim 9 wherein the electrical interface of the battery pack includes a plurality of electrical contacts,
    wherein the battery pack couples to the camera housing via an interface of the camera housing that includes a plurality of concentric electrical traces disposed in the back side of the camera housing,
    wherein one or more of the concentric electrical traces are configured to contact one or more of the plurality of electrical contacts of the battery pack and remain in contact with the one or more of the plurality of electrical contacts as the camera housing, while coupled to the battery pack, is rotated with respect to the battery pack.

13. The video camera system of claim 12 wherein the battery pack mechanically couples to the camera housing via a notched mounting apparatus disposed on the back side of the camera housing,
    wherein the battery pack is operable to mount to the notched mounting apparatus such that the battery pack is mechanically and rotatably coupled to the camera housing, and
    wherein one or more of the concentric electrical traces are configured to contact one or more of the plurality of electrical contacts of the battery pack and remain in contact with the one or more of the plurality of electrical contacts as the camera housing is rotated with respect to the battery pack.

14. A video camera system comprising:
a camera housing including a camera disposed in the camera housing;
a base unit including a slot disposed therein, the base unit rotatably coupled to the camera housing such that the camera housing can rotate with respect to the base unit on an axis; and
a base support including a tongue extending from an adjustable apparatus that can rotate over a range of motion,
wherein the tongue can be inserted and removed from the slot of the base unit to couple and decouple the base support from the base unit,
wherein a minimum force to insert or remove the tongue of the base support from the slot of the base unit is less than a minimum force to rotate the adjustable apparatus of the base support such that inserting or removing the tongue from the slot does not cause the adjustable apparatus to rotate.

15. The video camera system of claim 14 further comprising:
a surface mount coupled to:
the base support via a quick release mechanism; and
a surface via a fixed coupling means,
wherein the minimum force to rotate the adjustable apparatus is less than a minimum force to release the quick release mechanism such that rotating the adjustable apparatus does not cause the quick release mechanism to release, and
wherein the minimum force to cause the quick release mechanism to release is less than a minimum force to decouple the base support from the surface such that releasing the quick release mechanism does not cause the base support to decouple from the surface.

16. The video camera system of claim 14 wherein the adjustable apparatus includes a ball-and-socket joint.

17. The video camera system of claim 14 wherein the camera housing further includes:
a plurality of concentric electrical traces disposed in a back side of the camera housing; and
a notched mounting apparatus disposed on the back side of the camera housing,
wherein the notched mounting apparatus is operable to receive and secure the base unit to the camera housing such that the base unit is mechanically and rotatably coupled to the camera housing, and
wherein one or more of the concentric electrical traces are configured to contact one or more electrical contacts of the base unit and remain in contact with the one or more electrical contacts as the camera housing is rotated with respect to the base unit.

18. The video camera system of claim 14 wherein the base unit is a battery pack including one or more energy storage devices to store an electrical charge.

19. The video camera system of claim 14 wherein the base unit includes a shaft disposed internally and configured perpendicular to the slot, wherein the tongue includes a concavity configured to receive the shaft to secure the tongue inside the slot, and wherein the shaft, when securing the tongue inside the slot, increases the minimum force to insert or remove the tongue of the base support from the slot of the base unit.

* * * * *